United States Patent
Koga (10) Patent No.: US 12,374,715 B2
(45) Date of Patent: Jul. 29, 2025

(54) BATTERY HAVING A SOLID-STATE BATTERY CELL AND A BUFFER LAYER

(71) Applicant: Panasonic Intellectual Property Management Co., Ltd., Osaka (JP)

(72) Inventor: Eiichi Koga, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 539 days.

(21) Appl. No.: 17/870,827

(22) Filed: Jul. 22, 2022

(65) Prior Publication Data
US 2022/0359911 A1    Nov. 10, 2022

Related U.S. Application Data

(63) Continuation of application No. PCT/JP2020/047888, filed on Dec. 22, 2020.

(30) Foreign Application Priority Data

Feb. 20, 2020   (JP) .................................. 2020-026877

(51) Int. Cl.
| | |
|---|---|
| *H01M 10/0562* | (2010.01) |
| *H01M 10/0585* | (2010.01) |
| *H01M 50/293* | (2021.01) |
| *H01M 50/471* | (2021.01) |
| *H01M 50/581* | (2021.01) |

(52) U.S. Cl.
CPC ... *H01M 10/0562* (2013.01); *H01M 10/0585* (2013.01); *H01M 50/471* (2021.01); *H01M 50/581* (2021.01); *H01M 50/293* (2021.01)

(58) Field of Classification Search
None
See application file for complete search history.

(56) References Cited

U.S. PATENT DOCUMENTS

| | | |
|---|---|---|
| 2011/0070501 A1 | 3/2011 | Chang et al. |
| 2012/0208082 A1 | 8/2012 | Honda |
| | (Continued) | |

FOREIGN PATENT DOCUMENTS

| | | |
|---|---|---|
| CN | 109698316 A | 4/2019 |
| CN | 109728349 A | 5/2019 |
| | (Continued) | |

OTHER PUBLICATIONS

English Translation of Chinese Search Report dated Nov. 22, 2024 for the related Chinese Patent Application No. 202080095674.8.

(Continued)

*Primary Examiner* — Jonathan Crepeau
(74) *Attorney, Agent, or Firm* — Greenblum & Bernstein, P.L.C.

(57) ABSTRACT

A battery of the present disclosure includes a first solid-state battery cell and a buffer layer. The first solid-state battery cell includes a positive electrode, a negative electrode and a solid electrolyte layer located between the positive electrode and the negative electrode. The positive electrode or the negative electrode has a current collector. The buffer layer is in contact with a face of the current collector opposite to the solid electrolyte layer. The buffer layer includes a thermally expandable material and a conductive resin.

5 Claims, 3 Drawing Sheets

(56) References Cited

U.S. PATENT DOCUMENTS

| | | |
|---|---|---|
| 2018/0294471 A1 | 10/2018 | Hasegawa et al. |
| 2019/0123395 A1 | 4/2019 | Torita et al. |
| 2019/0131676 A1 | 5/2019 | Koga |
| 2020/0194795 A1* | 6/2020 | Torita ................. H01M 4/13 |

FOREIGN PATENT DOCUMENTS

| | | |
|---|---|---|
| JP | 2011-048932 | 3/2011 |
| JP | 2015-038876 | 2/2015 |
| KR | 10-2014-0070139 A | 6/2014 |
| WO | 2011/062065 | 5/2011 |

OTHER PUBLICATIONS

International Search Report of PCT application No. PCT/JP2020/047888 dated Feb. 22, 2021.
The EPC Office Action dated Oct. 11, 2024 for the related European Patent Application No. 20919985.0.

* cited by examiner

FIG. 2

BATTERY HAVING A SOLID-STATE BATTERY CELL AND A BUFFER LAYER

BACKGROUND

1. Technical Field

The present disclosure relates to a battery.

2. Description of the Related Art

Batteries may generate heat rapidly due to, for example, short circuits. Techniques that suppress such an increase in battery temperature have been suggested. For example, WO 2011/062065 (Patent Literature 1) discloses a secondary battery in which a current collector is formed using a thermally expandable material. Japanese Unexamined Patent Application Publication No. 2015-38876 (Patent Literature 2) discloses a battery that uses a conductive material including a foamable substance.

SUMMARY

In the related art, there is a demand that the generation of heat in batteries be suppressed.

One non-limiting and exemplary embodiment provides a highly reliable battery that can suppress the generation of heat in the battery.

In one general aspect, the techniques disclosed here feature a battery including a first solid-state battery cell and a buffer layer, wherein the first solid-state battery cell includes a positive electrode, a negative electrode and a solid electrolyte layer located between the positive electrode and the negative electrode, the positive electrode or the negative electrode has a current collector, the buffer layer is in contact with a face of the current collector opposite to the solid electrolyte layer, and the buffer layer includes a thermally expandable material and a conductive resin.

The battery according to the present disclosure can suppress the generation of heat in the battery and can realize high reliability.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

Summary of the Present Disclosure

A battery according to one aspect of the present disclosure includes a first solid-state battery cell and a buffer layer. The first solid-state battery cell includes a positive electrode, a negative electrode and a solid electrolyte layer located between the positive electrode and the negative electrode. The positive electrode or the negative electrode has a current collector. The buffer layer is in contact with a face of the current collector opposite to the solid electrolyte layer. The buffer layer includes a thermally expandable material and a conductive resin.

According to the above configuration, the thermally expandable material contained in the buffer layer is thermally expanded in the event of abnormal heating in the battery, and consequently the buffer layer increases its resistance to interrupt the current. Thus, the battery can attain high reliability and high performance with reduced probabilities of ignition or smoke combustion.

For example, the buffer layer may further include a metal. The metal may be at least one selected from the group consisting of Sn, Cu, Ag, Bi, Al and Zn.

In the above case, the buffer layer in intimate contact with the current collector can realize high impact resistance offered by the strong joint between the metal component and the current collector.

For example, the buffer layer may include an alloy layer at the interface with the current collector. The metal may be at least one selected from the group consisting of Sn, Bi, Al and Zn. The alloy layer includes an alloy containing the metal.

In the above case, the alloy layer formed at the interface joins the buffer layer and the current collector such as, for example, Cu or Al to each other, and the joint realizes a strong and low-resistance connection. Thus, the buffer layer functions with high reliability and does not cause deterioration in battery characteristics during normal battery operation.

For example, the thermally expandable material may be particles. The particles may be coated with the metal.

When the thermally expandable particles are caused to expand by an increase in temperature such as by ignition, the metal covering the thermally expandable particles comes off and the conductive path is easily interrupted. Thus, the battery can attain high reliability and high performance with reduced probabilities of ignition or smoke combustion.

For example, the battery according to one aspect of the present disclosure may further include a second solid-state battery cell. The first solid-state battery cell and the second solid-state battery cell may be laminated together through the buffer layer.

The battery cells may be laminated without deterioration of battery characteristics, and the resultant laminated battery is of high reliability and high performance and attains reduced probabilities of ignition or smoke combustion.

For example, the solid electrolyte layer may include a solid electrolyte having lithium ion conductivity.

For example, the thermally expandable material may be foamable particles.

The foamable particles present in, for example, the conductive resin or between the metal particles are thermally expanded to separate the conductive particles away from one another and consequently the conductive path is easily interrupted. Thus, the battery can attain high reliability and high performance with reduced probabilities of ignition or smoke combustion.

For example, the foamable particles may be microcapsules containing a gas inside the microcapsules.

In the above case, for example, the conductive particles forming a conductive path may be separated further from one another by the gas component discharged from the particles as well as by the thermal expansion of the foamable particles, and the buffer layer increases its resistance to interrupt the current more reliably. Further, the resistance increasing temperature may be controlled through the gas component.

Embodiments will be described in detail hereinbelow with reference to the drawings.

The embodiments discussed below illustrate comprehensive or specific examples. The configurations described in the embodiments below such as numerical values, shapes, materials, constituent elements, and the positions and manners of connection of the constituent elements are only illustrative and do not intend to limit the scope of the present disclosure thereto. Of the constituent elements described in the embodiments below, those which are not described in the independent claim are illustrated as optional constituent elements.

The drawings are not necessarily strict. In the drawings, substantially identical elements are assigned with the same numerals, and overlaps in the description of such elements will be omitted or simplified.

In the present specification and drawings, the x axis, the y axis and the z axis indicate the three axes in a three-dimensional orthogonal coordinate. In the embodiments, the z axis direction is the thickness direction of a battery. In the present specification, the term "thickness direction" is the direction that is perpendicular to the plane up to which layers are laminated.

In the present specification, the phrase "in plan view" means that a battery is viewed along the laminating direction of the battery. In the present specification, the term "thickness" means the length of a battery or a layer in the laminating direction.

In the present specification, "in" and "out" such as in the cases of "inside" and "outside" indicate whether the location of interest is "in"-side or "out"-side of the reference when the battery is viewed along the laminating direction of the battery.

In the present specification, the terms "on (or above)" and "under (or below)" used in the description of battery configurations do not mean being in the upward direction (perpendicularly above) and being in the downward direction (perpendicularly below) in the absolute spatial recognition, but indicate relative positional relationships based on the order in which layers are laminated. Further, the terms "on" and "under" mean not only that two constituent elements are disposed with a spacing therebetween and another constituent element is present between the two constituent elements, but also that two constituent elements are disposed in close and direct contact with each other.

EMBODIMENTS

[Overview of Batteries]

First, a battery according to an embodiment will be described.

Figure 1:
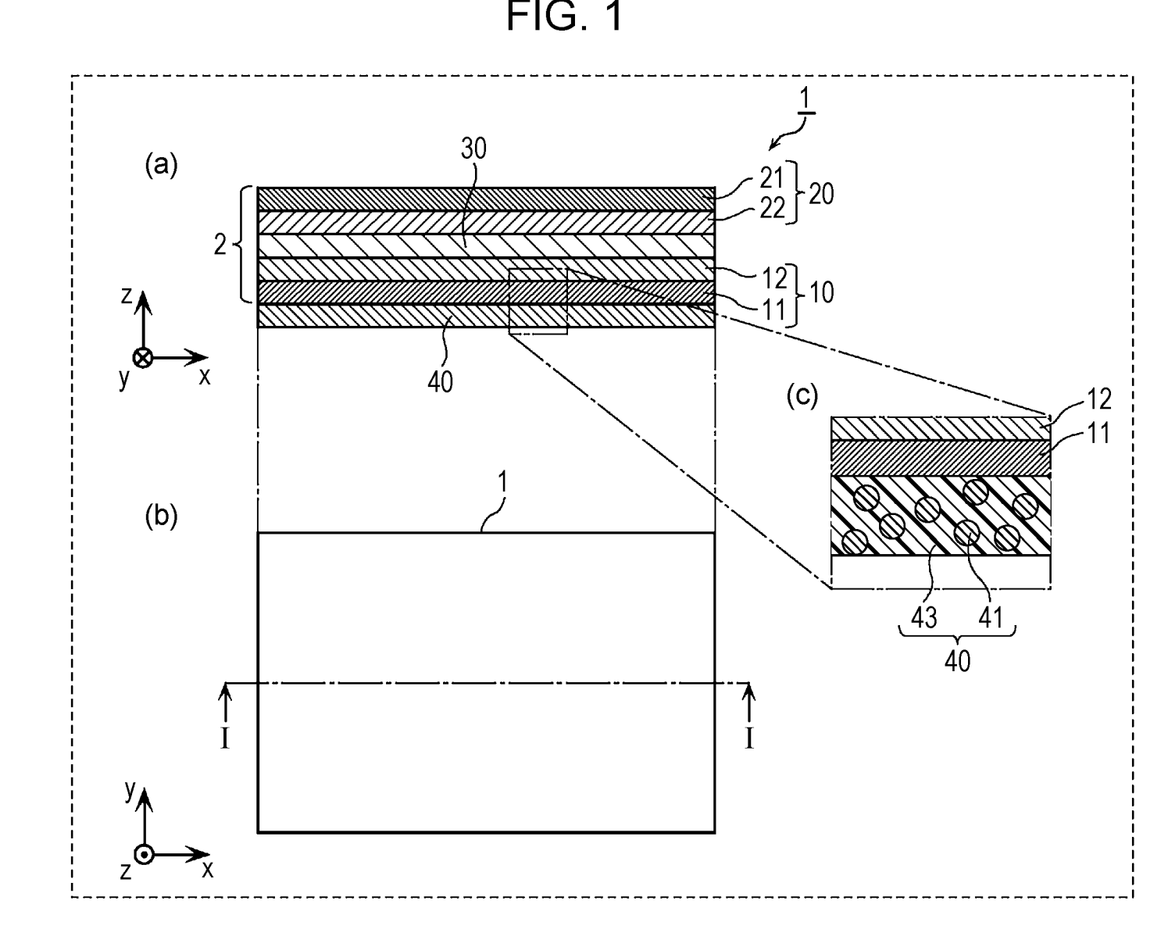
FIG. 1 is a set of views illustrating a schematic configuration of a battery according to an embodiment.

FIG. 1 is a set of views illustrating a schematic configuration of a battery according to the present embodiment. Specifically, FIG. 1(a) is a sectional view of a battery 1 according to the present embodiment, and FIG. 1(b) is a plan view of the battery 1 as viewed from the positive side in the z-axis direction. FIG. 1(a) illustrates a cross section at the position indicated by the line I-I in FIG. 1(b). FIG. 1(c) is an enlarged schematic sectional view of a portion of the cross section illustrated in FIG. 1(a).

As illustrated in FIG. 1, the battery 1 includes a solid-state battery cell 2 and a buffer layer 40. The battery 1 is an all-solid-state battery.

The solid-state battery cell 2 is an exemplary first solid-state battery cell, and includes a first electrode 10, a second electrode 20 and a solid electrolyte layer 30. The first electrode 10 has a first current collector 11 and a first active material layer 12 disposed in contact with the first current collector 11. The second electrode 20 is the counter electrode for the first electrode 10, and has a second current collector 21 and a second active material layer 22 disposed in contact with the second current collector 21. The solid electrolyte layer 30 is located between the first electrode 10 and the second electrode 20, and is in contact with the first active material layer 12 and the second active material layer 22. The buffer layer 40 is in contact with a face of the first current collector 11 opposite to the solid electrolyte layer 30. The buffer layer 40 includes a thermally expandable material 41 and a conductive resin 43.

As illustrated in FIG. 1, the first current collector 11 of the solid-state battery cell 2, and the buffer layer 40 are the same as one another in shape, position and size in plan view. The entirety of the face of the first current collector 11 on the buffer layer 40 side is in contact with the buffer layer 40. This manner of contact is advantageous from the point of view of reducing the resistance of the contact portion.

[Solid-State Battery Cells]

Hereinafter, the constituent elements of the solid-state battery cell 2 will be described in detail.

The first current collector 11, the first active material layer 12, the solid electrolyte layer 30, the second active material layer 22, the second current collector 21 and the buffer layer 40 are each rectangular in plan view. The shapes in plan view of the first current collector 11, the first active material layer 12, the solid electrolyte layer 30, the second active material layer 22, the second current collector 21 and the buffer layer 40 are not particularly limited and may be shapes other than rectangular such as circular, elliptical or polygonal.

In the present embodiment, the first electrode 10 is a positive electrode, and the second electrode 20 is a negative electrode. That is, the first current collector 11 is a positive electrode current collector, and the first active material layer 12 is a positive electrode active material layer. The second current collector 21 is a negative electrode current collector, and the second active material layer 22 is a negative electrode active material layer. The buffer layer 40 is connected to the positive electrode current collector.

The first electrode 10 may be a negative electrode, and the second electrode 20 may be a positive electrode. That is, the first current collector 11 may be a negative electrode current collector, and the first active material layer 12 may be a negative electrode active material layer. The second current collector 21 may be a positive electrode current collector, and the second active material layer 22 may be a positive electrode active material layer. The buffer layer 40 may be connected to the negative electrode current collector.

In the present specification, the first current collector 11 and the second current collector 21 may be collectively referred to simply as the "current collectors". The current collectors are not particularly limited as long as formed of a conductive material.

For example, the current collectors that are used may be foil-like bodies, plate-like bodies, mesh-like bodies or other forms of bodies made of such a material as stainless steel, nickel (Ni), aluminum (Al), iron (Fe), titanium (Ti), copper (Cu), palladium (Pd), gold (Au), platinum (Pt), or an alloy of two or more of these metals. The materials of the current collectors may be selected appropriately in consideration of the manufacturing process, the resistance to melting and decomposition at service temperatures and service pressures, the battery operating potentials applied to the current collectors, and conductivity. The materials of the current collectors may also be selected in accordance with the required levels of tensile strength and heat resistance. For example, the current collectors may be high-strength electrolytic copper foils or clad materials in which dissimilar metal foils are laminated.

For example, the thickness of the current collectors is in the range of greater than or equal to 10 μm and less than or equal to 100 μm. From the point of view of increasing the adhesion with the first active material layer 12 and the second active material layer 22, and the adhesion with the buffer layer 40, the surface of the current collectors may be roughened to have irregularities. Further, the surface of the current collectors may be coated with an adhesive component such as an organic binder. In this manner, the quality of interface joint between the current collectors and other layers may be enhanced, and the in-plane operation of the buffer layer 40, specifically, the in-plane characteristics of increasing the resistance and interrupting the current may be rendered uniform and more reliable by virtue of the mechanical and thermal reliabilities of the battery and also due to cycle characteristics and the quality of joint with the buffer layer 40.

The first active material layer 12 is disposed in contact with one face of the first current collector 11. The first active material layer 12 in the present embodiment is a positive electrode active material layer, and therefore the first active material layer 12 includes at least a positive electrode active material. The first active material layer 12 is a layer principally composed of a positive electrode material such as a positive electrode active material. The positive electrode active material is a material that is oxidized or reduced in conjunction with intercalation or deintercalation of metal ions such as lithium (Li) ions or magnesium (Mg) ions into or from the crystal structure at a higher potential than the negative electrode. The type of the positive electrode active material may be selected appropriately in accordance with the type of the battery, and a known positive electrode active material may be used.

Examples of the positive electrode active materials include compounds containing lithium and a transition metal element, with specific examples including oxides containing lithium and a transition metal element, and phosphoric acid compounds containing lithium and a transition metal element. Examples of the oxides containing lithium and a transition metal element include layered oxides such as lithium nickel composite oxides including $LiNi_xM_{1-x}O_2$ (wherein M is at least one element of Co, Al, Mn, V, Cr, Mg, Ca, Ti, Zr, Nb, Mo and W, and x is 0<x≤1), lithium cobalt oxide ($LiCoO_2$), lithium nickel oxide ($LiNiO_2$) and lithium manganese oxide ($LiMn_2O_4$), and lithium manganese oxides having a spinel structure (for example, $LiMn_2O_4$, $Li_2MnO_3$ and $LiMnO_2$). Examples of the phosphoric acid compounds containing lithium and a transition metal element include lithium iron phosphate ($LiFePO_4$) having an olivine structure. The positive electrode active material may also include sulfur (S) or a sulfide such as lithium sulfide ($Li_2S$). In this case, the positive electrode active material that is used may be positive electrode active material particles that are coated or combined with, for example, lithium niobium oxide ($LiNbO_3$). The positive electrode active materials may be used singly, or two or more may be used in combination.

As described hereinabove, the first active material layer 12 that is a positive electrode active material layer includes at least a positive electrode active material. The positive electrode active material layer may be a mixture layer composed of a mixture of a positive electrode active material and an additive material. Examples of the additive materials that may be used include solid electrolytes such as inorganic solid electrolytes and sulfide-based solid electrolytes, conductive auxiliaries such as acetylene black, and binders such as polyethylene oxide and polyvinylidene fluoride. When the positive electrode active material layer is a mixture of a positive electrode active material and an additive material such as a solid electrolyte in a predetermined ratio, the lithium ion conductivity and also the electron conductivity in the positive electrode active material layer may be enhanced.

For example, the thickness of the first active material layer 12 is, although not limited to, greater than or equal to 5 μm and less than or equal to 300 μm.

The second active material layer 22 is disposed in contact with one face of the second current collector 21. The second active material layer 22 in the present embodiment is a negative electrode active material layer, and therefore the second active material layer 22 includes at least a negative electrode active material. The second active material layer 22 is a layer principally composed of a negative electrode material such as a negative electrode active material. The negative electrode active material is a material that is oxidized or reduced in conjunction with intercalation or deintercalation of metal ions such as lithium (Li) ions or magnesium (Mg) ions into or from the crystal structure at a lower potential than the positive electrode. The type of the negative electrode active material may be selected appropriately in accordance with the type of the battery, and a known negative electrode active material may be used.

Examples of the negative electrode active materials that may be used include carbon materials such as natural graphite, artificial graphite, graphitized carbon fibers and heat-treated resin carbon, and alloy-based materials miscible with solid electrolytes. Examples of the alloy-based materials that may be used include lithium alloys such as LiAl, LiZn, $Li_3Bi$, $Li_3Cd$, $Li_3Sb$, $Li_4Si$, $Li_{4.4}Pb$, $Li_{4.4}Sn$, $Li_{0.17}C$ and $LiC_6$, oxides of lithium and a transition metal element such as lithium titanium oxide ($Li_4Ti_5O_{12}$), and metal oxides such as zinc oxide (ZnO) and silicon oxide ($SiO_x$). The negative electrode active materials may be used singly, or two or more may be used in combination.

As described hereinabove, the second active material layer 22 that is a negative electrode active material layer includes at least a negative electrode active material. The negative electrode active material layer may be a mixture layer composed of a mixture of a negative electrode active material and an additive material. Examples of the additive materials that may be used include solid electrolytes such as inorganic solid electrolytes and sulfide-based solid electrolytes, conductive auxiliaries such as acetylene black, and binders such as polyethylene oxide and polyvinylidene fluoride. When the negative electrode active material layer is a mixture of a negative electrode active material and an additive material such as a solid electrolyte in a predetermined ratio, the lithium ion conductivity and also the electron conductivity in the negative electrode active material layer may be enhanced.

For example, the thickness of the second active material layer 22 is, although not limited to, greater than or equal to 5 μm and less than or equal to 300 μm.

The solid electrolyte layer 30 is disposed between and in contact with the first active material layer 12 and the second active material layer 22. The solid electrolyte layer 30 includes at least a solid electrolyte. For example, the solid electrolyte layer 30 includes a solid electrolyte as a principal component.

The solid electrolyte may be a known solid electrolyte for batteries that has ion conductivity. The solid electrolyte that is used may be, for example, a solid electrolyte capable of conducting metal ions such as Li lithium ions or Mg magnesium ions. The type of the solid electrolyte may be selected appropriately in accordance with the type of conducted ions. Examples of the solid electrolytes that may be used include inorganic solid electrolytes such as sulfide-based solid electrolytes and oxide-based solid electrolytes. Examples of the sulfide-based solid electrolytes that may be used include lithium-containing sulfides such as $Li_2S$—$P_2S_5$ system, $Li_2S$—$SiS_2$ system, $Li_2S$—$B_2S_3$ system, $Li_2S$—$GeS_2$ system, $Li_2S$—$SiS_2$—$LiI$ system, $Li_2S$—$SiS_2$—$Li_3PO_4$ system, $Li_2S$—$Ge_2S_2$ system, $Li_2S$—$GeS_2$—$P_2S_5$ system and $Li_2S$—$GeS_2$—$ZnS$ system. Examples of the oxide-based solid electrolytes that may be used include lithium-containing metal oxides such as $Li_2O$—$SiO_2$ and $Li_2O$—$SiO_2$—$P_2O_5$, lithium-containing metal nitrides such as $Li_xP_yO_{1-z}N_z$, lithium phosphate ($Li_3PO_4$), and lithium-containing transition metal oxides such as lithium titanium oxide. The solid electrolytes may be used singly, or two or more may be used in combination. For example, the solid electrolyte layer 30 in the present embodiment includes a solid electrolyte having lithium ion conductivity.

In addition to the solid electrolyte material described above, the solid electrolyte layer 30 may include, for example, a binder such as polyethylene oxide or polyvinylidene fluoride.

For example, the thickness of the solid electrolyte layer 30 is, although not limited to, greater than or equal to 5 μm and less than or equal to 150 μm.

The material of the solid electrolyte may be aggregates of particles. Alternatively, the material of the solid electrolyte may be a sintered structure.

[Buffer Layers]

Next, a specific configuration of the buffer layer 40 will be described.

The buffer layer 40 is a layer having conductivity. The buffer layer 40 is used to establish an electrical connection between the solid-state battery cell 2 and another solid-state battery cell or other member. The buffer layer 40 also functions to buffer the impact to the solid-state battery cell 2.

The buffer layer 40 contains a thermally expandable material 41 having thermal expandability, and a conductive resin 43. For example, the conductive resin 43 contains a thermosetting resin such as epoxy and conductive particles such as Ag. The conductive resin 43 may be an insulating resin containing a conductive filler such as metal particles, or may be a conductive polymer containing no conductive fillers.

The thermally expandable material 41 includes at least one of a thermally expandable resin that expands with an increase in temperature, or thermally expandable particles that expand with an increase in temperature.

The thermally expandable resin that is used may be a known thermally expandable resin. Examples of the thermally expandable resins include polymers such as polyamide (PA), polyimide, polyamidimide, wholly aromatic polyamide, polyetherimide, polysulfone, polyethersulfone, polyethylene terephthalate (PET), polyether ether ketone (PEEK), polytetrafluoroethylene (PTFE), polyvinylidene fluoride (PVDF), polypropylene (PP) and polyethylene (PE). The polymers may be used singly, or two or more may be used in combination. Further, the polymer may be used as a mixture with thermally expandable particles described below.

For example, the thermally expandable particles are foamable particles. The foamable particles are microcapsules containing a gas inside the microcapsules. Specifically, the foamable particles are thermally expandable microcapsules in which thermoplastic resin microcapsules are filled with a low-boiling gas. The material of the microcapsules, that is, the shells is not particularly limited as long as the material is electrochemically stable and has a strength enough to maintain the shape even after expansion. The material may be the thermally expandable resin described hereinabove. The thermal expansion material that fills the microcapsules is not particularly limited as long as the material does not adversely affect properties of the battery even if the material leaks from the microcapsules. For example, the thermal expansion material may be a low-boiling gas such as a low-boiling hydrocarbon. For example, thermally expandable particles having an average particle size of about 10 μm may be used.

In the thermally expandable particles, the thermal expansion start temperature of the microcapsules is in the range of, for example, greater than or equal to 150° C. and less than or equal to 250° C. For example, the thermal expansion start temperature may be less than or equal to 200° C., or may be less than or equal to 180° C. The thermal expansion rate may be variable depending on the design as long as the microstructures of the conductive resin are rendered discontinuous and separate from one another to interrupt the conduction through the buffer layer 40. The phrase that the conduction through the buffer layer 40 is interrupted means that the joint between the buffer layer and the current collector experiences an increase in resistance. For example, the thermal expansion rate of the thermally expandable particles is greater than or equal to 30 times and less than or equal to 80 times to ensure that the microstructures of the conductive resin will be separated from one another. The thermally expandable particles may be a mixture of particles having different thermal expansion rates.

The temperature at which abnormal heating is to be suppressed, that is, the temperature at which the progress of heat generation is to be stopped may be controlled by appropriately selecting or appropriately combining the thermally expandable materials 41 such as thermally expandable particles and thermally expandable resins. By controlling the thermal expansion temperature to a desired temperature, the thermally expandable material 41 can be designed to expand and interrupt the current before the battery catches fire or burns with smoke due to abnormal heating. In addition to the thermally expandable particles, the buffer layer 40 may contain, for example, a binder such as polyethylene oxide or polyvinylidene fluoride.

The buffer layer 40 may contain a highly thermally conductive material as long as battery characteristics are not impaired. In this case, heat may be conducted within the buffer layer 40 quickly and uniformly in an accelerated manner with the result that the current collector and the buffer layer 40 can be electrically separated from each other. For example, the highly thermally conductive material that is used may be a highly insulating powder such as aluminum oxide or aluminum nitride, or may be a metal powder. The highly thermally conductive material that is used may be a thermally expandable resin such as, for example, an epoxy resin.

For example, the thickness of the buffer layer 40 is, although not limited to, greater than or equal to 5 µm and less than or equal to 300 µm.

In view of the function of the buffer layer 40, for example, the conductive resin 43 in the buffer layer 40 is expected to have a Young's modulus lower than the Young's modulus of the current collector. Such a configuration relaxes stress that is generated at the interface between the solid-state battery cell 2 and the buffer layer 40 due to temperature change or external stress. As a result, gaps will not be formed at the connection interface between the current collector and the buffer layer 40, and the occurrence of connection resistance defects during normal battery operation is suppressed. Further, such a buffer layer 40 is easily deformed in conjunction with the surface of the current collector and also in conjunction with the shape of the thermally expandable particles during the laminating and compression process, thus offering high reliability of the buffer layer 40. The relative relationships of the above Young's moduli may be measured by pushing a probe into each of the constituent elements, and comparing pressure-displacement characteristics or the sizes of dents relative to one another.

The types, the shapes and the blending ratios of the materials for the buffer layer 40 may be controlled in light of the ease in production process as well as the stress relaxation performance, the thermal shock resistance and the thermal cycle resistance. Voids may be formed appropriately in the inside of the buffer layer 40 to control the Young's modulus of the buffer layer 40. The state of voids may be determined by a usual cross-sectional observation technique such as with an optical microscope or an electron microscope. Alternatively, a randomly selected cross section may be analyzed by a technique such as CT (computed tomography) scanning.

In addition to the thermally expandable material 41, a material that contains a solid electrolyte, an active material and current collector material particles may be added to the conductive resin 43 in the buffer layer 40. In this manner, the expansion/contraction characteristics of the buffer layer 40 approach those of the solid-state battery cell 2. As a result, stress that is generated between the buffer layer 40 and the current collector due to temperature change or during charging/discharging is relaxed, and the battery 1 increases the resistance with temperature in a highly reliable manner.

The buffer layer 40 may not be formed over the entirety of the face of the current collector, and may be formed partially, for example, may be patterned on the face of the current collector in contact therewith. That is, the buffer layer 40 may be formed in any manner as long as it is connected in series with the current collector.

The thickness of the buffer layer 40 is not particularly limited, but a smaller thickness is more advantageous from the point of view of the volumetric energy density of the battery 1. That is, the thickness may be reduced as long as the reliability such as the withstand voltage and withstand current characteristics of the buffer layer 40 may be ensured. For example, the thickness of the buffer layer 40 is greater than or equal to 1 µm and less than or equal to 100 µm, and preferably greater than or equal to 2 µm and less than or equal to 10 µm. With such a configuration, the decrease in volumetric energy density is small while ensuring that the buffer layer will relax stress caused by expansion or contraction of the current collector due to temperature change.

The specific gravity of the buffer layer 40 is not particularly limited, but a lower specific gravity is more preferable from the point of view of weight energy density. For example, the specific gravity of the buffer layer 40 may be lower than the specific gravity of the current collectors made of metal materials. Such a buffer layer has less influence on the weight energy density.

[Effects and Other Facts]

When compared to the configurations of the batteries described in Patent Literature 1 and Patent Literature 2, the configuration of the battery 1 according to the present embodiment has the following differences.

First, Patent Literature 1 discloses a secondary battery in which a current collector is formed using a thermally expandable material 41. In the battery according to Patent Literature 1, the thermally expandable material is a current collector and the electrolyte is a polymer solid electrolyte. That is, the battery according to Patent Literature 1 differs from the battery 1 according to the present embodiment in terms of battery configuration.

When the current collector is made of a thermally expandable material as is the case in the battery according to Patent Literature 1, the conductivity is low as compared to, for example, a Cu current collector, and the electrical resistance is high at the joint interface between the current collector and an active material. Thus, charging/discharging characteristics of the battery are deteriorated. When such a current collector is joined with an all-solid-state power generation element that includes a rigid solid electrolyte, Joule heat generated by the resistance at the interface produces a stress that gives rise to structural defects such as separation, thus deteriorating repetition characteristics.

Patent Literature 2 discloses a battery that uses a conductive material including a foamable substance. The conductive material layer containing a foamable substance is in contact with an active material layer similarly to Patent Literature 1. Thus, the battery has the same problems as Patent Literature 1 described above. Further, the battery disclosed in Patent Literature 2 does not include a solid electrolyte.

In contrast, the battery 1 according to the present embodiment is designed so that the buffer layer 40 including the thermally expandable material 41 is provided on the face of the current collector opposite to the face on which the active material layer is disposed. That is, the buffer layer 40 including the thermally expandable material 41 is provided on the current collector and is a member distinct from the current collector. For example, this configuration can suppress an increase in electrical resistance at the joint interface between the active material and the current collector. Patent Literature 1 and Patent Literature 2 do not disclose or suggest the battery in which the buffer layer 40 including the thermally expandable material 41 in the conductive resin 43 is provided on the face of the current collector opposite to the active material layer.

As described hereinabove, the battery 1 according to the present embodiment attains reduced probabilities of ignition and smoke combustion of the battery due to heat generation or overcurrent. That is, the battery 1 can realize high reliability and high performance.

Modification Example 1

Hereinbelow, Modification Example 1 of the embodiment will be described. The following description of Modification Example 1 will focus on the differences from the embodiment, and will omit or simplify the explanation of commonalities.

Figure 2:
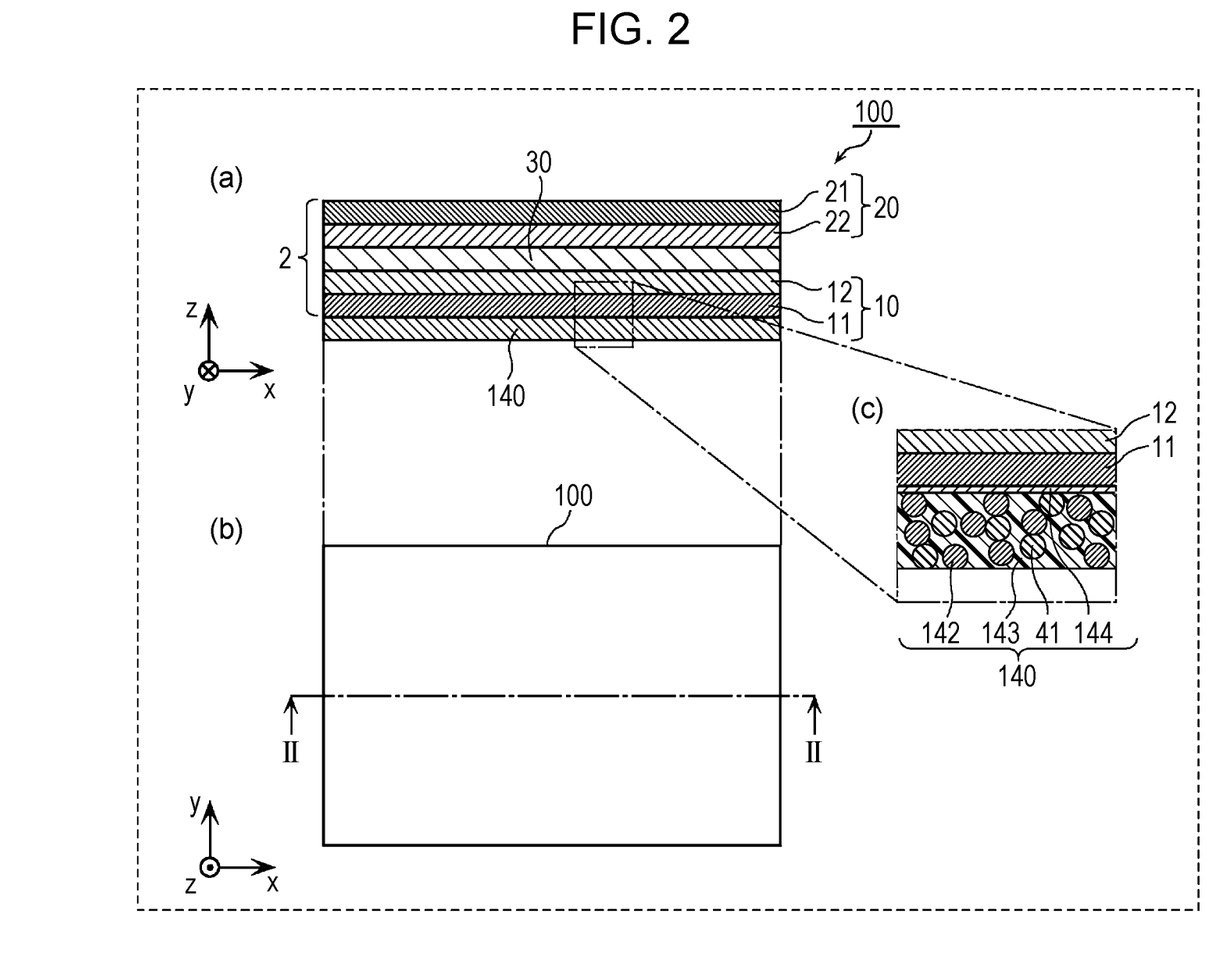
FIG. 2 is a set of views illustrating a schematic configuration of a battery according to Modification Example 1 of the embodiment.

FIG. 2 is a set of views illustrating a schematic configuration of a battery according to Modification Example 1 of the embodiment. Specifically, FIG. 2(a) is a sectional view of a battery 100 according to Modification Example 1, and FIG. 2(b) is a plan view of the battery 100 as viewed from the positive side in the z-axis direction. FIG. 2(a) illustrates a cross section at the position indicated by the line II-II in FIG. 2(b). FIG. 2(c) is an enlarged schematic sectional view of a portion of the cross section illustrated in FIG. 2(a).

As illustrated in FIG. 2, the battery 100 according to Modification Example 1 of the embodiment differs from the battery 1 according to the embodiment in that the battery 100 has a buffer layer 140 in place of the buffer layer 40. The buffer layer 140 includes a metal 142 and a resin 143. The buffer layer 140 further includes an alloy layer 144 in contact with the current collector. The alloy layer 144 principally contains the metal 142. The alloy layer 144 is a layer formed by diffusion of the metal 142 having a low melting point into the current collector, and strongly joins the current collector and the buffer layer 140 to each other. For example, the alloy layer 144 may be formed in such a manner that a resin layer containing a low-melting metal 142 in a thermosetting resin is cured by heat treatment at an appropriate temperature to cause the metal to be diffused from the resin layer into the current collector to form an alloy layer 144.

For example, the metal 142 is at least one selected from the group consisting of Sn (tin), Ag (silver), Cu (copper), bismuth (Bi), Al (aluminum) and Zn (zinc), or is an alloy of any of these metals. Silver and copper are metal elements contained in a general conductive resin and thus may be excluded from the group. That is, the metal 142 may be at least one selected from the group consisting of Sn, Al, Mg and Zn.

The metal having a low melting point is a metal having a melting point of, for example, less than or equal to 300° C. Specifically, for example, use may be made of tin, tin-zinc alloy, tin-silver alloy, tin-copper alloy, tin-aluminum alloy, tin-lead alloy, indium, indium-silver alloy, indium-zinc alloy, indium-tin alloy, bismuth, bismuth-silver alloy, bismuth-nickel alloy, bismuth-tin alloy, bismuth-zinc alloy or bismuth-lead alloy. When, for example, the current collector is Cu and the metal 142 is Sn, heat treatment results in tin-copper alloy that is diffused at the interface to form an alloy layer 144 including the metal 142. The low-melting metal 142 can bond and form a strong joint interface even at a temperature about half of the melting point. The alloying and the diffusion take place at a low temperature when the particle size of the metal 142 is small.

For example, the proportion of the metal 142 is 1 vol % to 10 vol % relative to the volume of the buffer layer 140. The ingredient components and the contents are selected in light of the thickness of the alloy layer 144 and the joint strength. Properties such as thickness of the alloy layer 144 may be controlled appropriately by manipulating the heat treatment temperature.

In the present modification example, the resin 143 is a conductive resin similarly to the conductive resin 43 according to the embodiment. Alternatively, the resin 143 may be an insulating resin. That is, the conductive function in the buffer layer 140 may be played by the metal 142. The resin 143 may contain a blend that includes not only the metal 142 for forming an alloy with the current collector, but also a metal powder generally used as an electrode such as Ag, Ni, Pd or Pt. Alternatively, the above metal powder and the metal 142 may be alloyed, and the resultant metal material may be used while ensuring that conductivity and ohmic contact can be obtained.

In the present modification example, the buffer layer 140 may be composed of a plurality of layers of different materials, for example, a plurality of layers containing the thermally expandable material 41 and the metal 142 in different ratios.

As described above, the battery 100 according to Modification Example 1 can attain a strong joint between the current collector and the buffer layer 140. As a result, the buffer layer 140 in the battery 100 can realize higher reliability against impacts, thermal cycles and charging/discharging cycles.

Modification Example 2

Hereinbelow, Modification Example 2 of the embodiment will be described. The following description of Modification Example 2 will focus on the differences from the embodiment and Modification Example 1, and will omit or simplify the explanation of commonalities.

Figure 3:
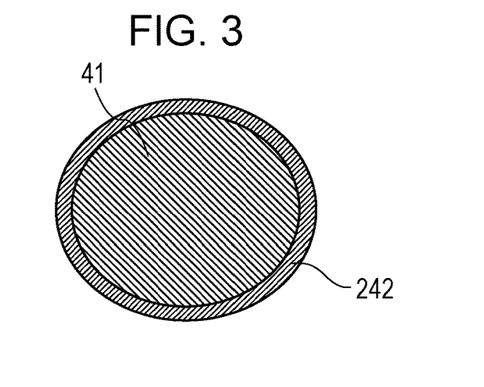
FIG. 3 is a view illustrating a schematic configuration of a particulate thermally expandable material and a metal layer in a buffer layer of a battery according to Modification Example 2 of the embodiment.

FIG. 3 is a view illustrating a schematic configuration of a particulate thermally expandable material and a metal layer in a buffer layer of a battery according to Modification Example 2. As illustrated in FIG. 3, the surface of a particulate thermally expandable material 41 is coated with a metal layer 242. While the structure according to Modification Example 1 of the embodiment has been illustrated as being a dispersion of particles of the thermally expandable material 41 and particles of the metal 142 as a mixture, Modification Example 2 is such that the particulate thermally expandable material 41 is coated with the metal layer 242.

According to the above configuration, the particulate thermally expandable material 41 and the metal layer 242 are connected to each other with the conductor covering the surface. In the event of heat generation, the conductor structure of the metal layer 242 on the surface is caused to expand and the resistance is thereby increased. Thus, the battery is provided with a function that suppresses heat generation in the battery.

The coating of the metal layer 242 may be formed by a powder coating process such as a mechanical powder composite process or by deposition treatment. The coating film thickness of the metal layer 242 is, for example, less than or equal to 1 μm.

As described above, the battery according to Modification Example 2 attains reduced probabilities of ignition and smoke combustion of the battery due to heat generation or overcurrent. That is, the battery can realize high reliability and high performance.

The thermally expandable material 41 coated with the metal layer 242 according to Modification Example 2 may be added as the thermally expandable material 41 to the conductive resin 43 or the resin 143 in each of the embodiment and Modification Examples 1 and 3.

Modification Example 3

Hereinbelow, Modification Example 3 of the embodiment will be described. The following description of Modification Example 3 will focus on the differences from the embodiment, and will omit or simplify the explanation of commonalities.

Figure 4:
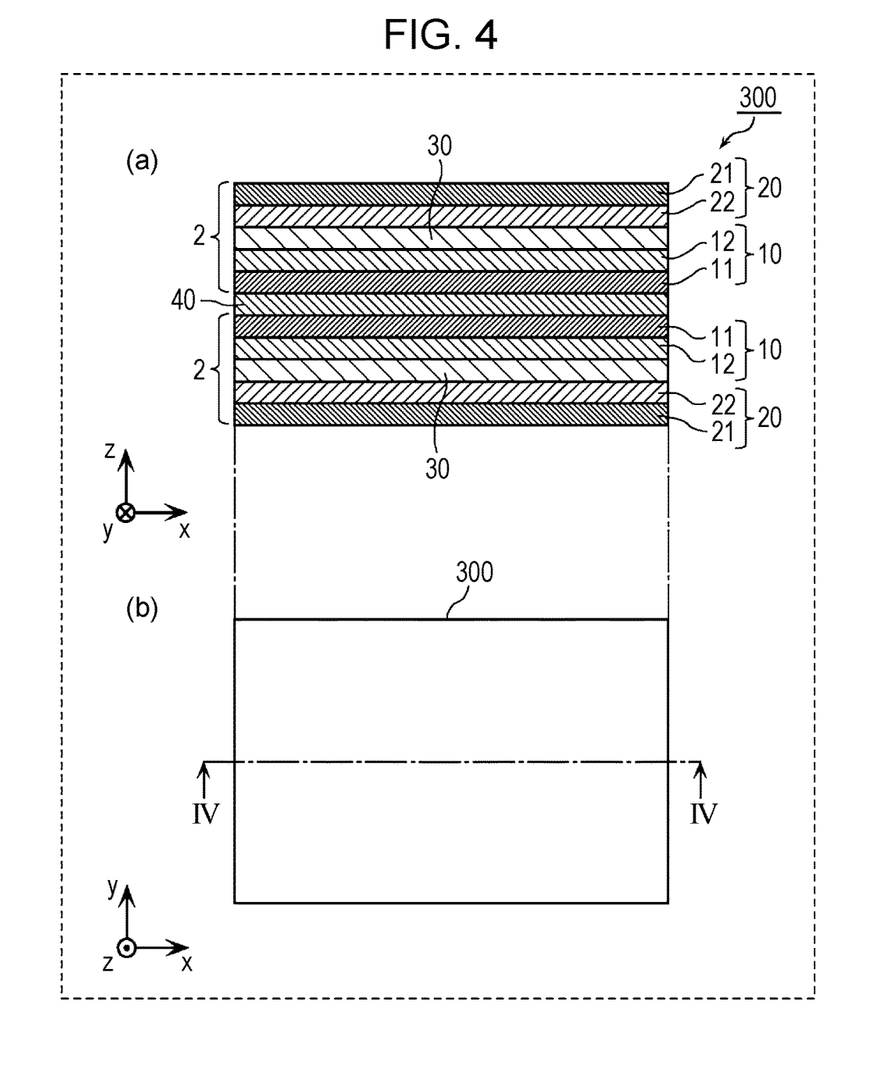
FIG. 4 is a set of views illustrating a schematic configuration of a laminated battery according to Modification Example 3 of the embodiment.

FIG. 4 is a set of views illustrating a schematic configuration of a battery according to Modification Example 3 of the embodiment. Specifically, FIG. 4(a) is a sectional view of a laminated battery 300 according to Modification Example 3, and FIG. 4(b) is a plan view of the laminated battery 300 as viewed from the positive side in the z-axis direction. FIG. 4(a) illustrates a cross section at the position indicated by the line IV-IV in FIG. 4(b).

As illustrated in FIG. 4, the laminated battery 300 according to Modification Example 3 differs from the battery 1 according to the embodiment in that two solid-state battery cells 2 are laminated and connected to each other through the buffer layer 40.

The two solid-state battery cells 2 are examples of the first solid-state battery cell and the second solid-state battery cell, respectively. The two solid-state battery cells 2 are laminated together through the buffer layer 40 and are electrically connected to each other in series.

In the example illustrated in FIG. 4, the two solid-state battery cells 2 are connected to each other through the respective positive electrode current collectors. As described in the embodiment, the first current collector 11 may be a negative electrode current collector. That is, the laminated battery 300 may include two solid-state battery cells 2 connected to each other through the respective negative electrode current collectors. The laminated body may include three or more solid-state battery cells 2.

With this configuration, a short circuit or abnormal heating that occurs in one of the solid-state battery cells 2 activates the buffer layer 40 to increase the resistance and the current is thereby interrupted.

As described above, the laminated battery 300 according to Modification Example 3 attains reduced probabilities of ignition and smoke combustion of the battery due to heat generation or overcurrent. That is, the battery can realize high reliability and large capacity.

[Battery Production Methods]

Next, an example method for producing the battery according to the present embodiment will be described. The following describes a method for producing the battery 1 according to the embodiment described hereinabove. First, pastes are prepared that are used for printing of a first active material layer (hereinafter, the positive electrode active material layer) 12 and a second active material layer (hereinafter, the negative electrode active material layer) 22. A solid electrolyte material is provided for use in each of a mixture for a positive electrode active material layer and a mixture for a negative electrode active material layer. For example, the solid electrolyte material is a $Li_2S$—$P_2S_5$-based sulfide glass powder having an average particle size of about 10 μm and principally including a triclinic crystal. For example, this glass powder may be a glass powder having a high ion conductivity of about $2 \times 10^{-3}$ S/cm to $3 \times 10^{-3}$ S/cm. The positive electrode active material used here may be, for example, a powder of a layered Li·Ni·Co·Al composite oxide (specifically, $LiNi_{0.8}Co_{0.15}Al_{0.05}O_2$) having an average particle size of about 5 μm. A mixture containing the positive electrode active material and the glass powder is dispersed into a medium such as an organic solvent to give a positive electrode active material layer paste. The negative electrode active material used here may be, for example, a natural graphite powder having an average particle size of about 10 μm. A mixture containing the negative electrode active material and the glass powder is similarly dispersed into a medium such as an organic solvent to give a negative electrode active material layer paste.

Next, for example, a copper foil having a thickness of about 30 μm is provided as a material for use as a first current collector 11 (hereinafter, the positive electrode current collector) and a second current collector 21 (hereinafter, the negative electrode current collector). The positive electrode active material layer paste and the negative electrode active material layer paste are each printed by a screen printing method in a predetermined shape and a thickness of about 50 μm to 100 μm onto one face of the respective sheets of the copper foil. The positive electrode active material layer paste and the negative electrode active material layer paste are dried at a temperature in the range of 80° C. to 130° C. and become about 30 μm to 60 μm in thickness. Thus, a positive electrode active material layer and a negative electrode active material layer are formed on the respective sheets of the current collector (the copper foil). That is, a first electrode 10 (hereinafter, the positive electrode) and a second electrode 20 (hereinafter, the negative electrode) are obtained.

Next, a solid electrolyte layer paste is prepared by dispersing a mixture that contains the glass powder described hereinabove into a medium such as an organic solvent. Using a metal mask, the solid electrolyte layer paste is printed with a thickness of, for example, about 100 μm onto the surface of the active material layer in each of the positive electrode and the negative electrode. The positive electrode and the negative electrode printed with the solid electrolyte layer paste are dried at a temperature in the range of 80° C. to 130° C.

Next, the positive electrode and the negative electrode are combined together in such a manner that the solid electrolyte printed on the positive electrode active material layer of the positive electrode is opposed in contact to the solid electrolyte printed on the negative electrode active material layer of the negative electrode.

Next, elastic sheets having an elastic modulus of about $5 \times 10^6$ Pa are inserted into the gaps between the upper face of the current collector and the pressure die plate. For example, the thickness of the elastic sheet is 70 μm. Subsequently, the unit is pressed for 90 seconds while heating the pressure die plates at 50° C. at a pressure of 300 MPa.

A solid-state battery cell 2 is fabricated through the steps described above.

Next, a particulate thermally expandable material 41 having an average particle size of about 5 μm is added to a thermosetting conductive resin paste containing silver particles with an average particle size of 0.5 μm. The mixture is dispersed with a three-roll mill to give a resin paste (namely, a resin paste for a buffer layer 40) containing the thermally expandable material 41. In this process, a Sn powder having an average particle size of 0.5 μm may be further added as a metal 142 to prepare a resin paste for a buffer layer 140. Next, the resin paste for a buffer layer 40 or 140 is printed through a metal mask onto the surface of the current collector in the solid-state battery cell 2. Next, the paste is subjected to thermosetting treatment in a dryer, for example, at 120° C. for 1 hour, and is cooled to room temperature. A buffer layer 40 or 140 is thus formed from the buffer layer 40 or 140 resin paste.

A battery 1 is fabricated through the steps described above. The method for fabricating the battery 1, and the order of the steps are not limited to the above example.

While the production method described above illustrates that the positive electrode active material layer paste, the negative electrode active material layer paste, the solid electrolyte layer paste, and the buffer layer 40 or 140 resin paste are applied by printing, the application method is not limited to printing and may be, for example, a doctor blade method, a calender method, a spin coating method, a dip coating method, an inkjet method, an offset method, a die coating method or a spraying method.

While the production method described above illustrates that the buffer layer 40 or 140 resin paste is a thermosetting conductive resin paste containing silver metal particles and/or Sn particles, the conductive resin paste is not limited thereto and may be, for example, a conductive resin paste that contains highly conductive high-melting metal particles having a melting point of higher than or equal to 400° C., or low-melting metal particles having a melting point of lower than or equal to the curing temperature of the conductive resin paste, for example, lower than or equal to 300° C. Examples of the materials of the highly conductive high-melting metal particles include silver, copper, nickel, zinc, aluminum, palladium, gold, platinum, and alloys combining any of these metals. Examples of the low-melting metal materials having a melting point of lower than or equal to 300° C. include tin, tin-zinc alloy, tin-silver alloy, tin-copper alloy, tin-aluminum alloy, tin-lead alloy, indium, indium-silver alloy, indium-zinc alloy, indium-tin alloy, bismuth, bismuth-silver alloy, bismuth-nickel alloy, bismuth-tin alloy, bismuth-zinc alloy and bismuth-lead alloy. When the conductive resin paste that is used contains such low-melting metal particles, solid-phase reaction and liquid-phase reaction proceed at a lower temperature due to the effect of the large surface area of the powder, that is, due to the effect of the large reaction area at contact sites between the metal particles and the metal in the current collector. The solid-phase and liquid-phase reactions at the interface between the buffer layer 40 or 140 and the surface of the current collector form an alloy, which diffuses at the interface of the contact sites. As a result, the buffer layer 40 or 140 can be strongly joined to the current collector at the interface. When, for example, silver or a silver alloy is used as the conductive metal particles and copper is used as the current collector, the reaction of Cu is effectively promoted and a highly conductive silver-copper alloy is easily formed. As a result of the configuration described above, the buffer layer 40 or 140 and the current collector are more strongly joined together, and the buffer layer 40 or 140 is effectively resistant to, for example, separation due to thermal cycles or impacts.

The highly conductive high-melting metal particles and the low-melting metal particles may have any shapes such as spherical shapes, scale-like shapes and acicular shapes. The particle sizes of the highly conductive high-melting metal particles and the low-melting metal particles are not particularly limited. In view of the fact that, for example, particles having a smaller size undergo the alloying reactions and diffusion at a lower temperature, the particle size and the shape are selected appropriately in consideration of the process design and the influence of the thermal history on the battery characteristics.

The resin used in the thermosetting conductive resin paste may be any resin that functions as a binder, and may be selected appropriately based on, for example, printability or applicability depending on the production process that will be adopted. For example, the resin used in the thermosetting conductive resin paste includes a thermosetting resin. Examples of the thermosetting resins include (i) amino resins such as urea resins, melamine resins and guanamine resins, (ii) epoxy resins such as bisphenol A epoxy resins, bisphenol F epoxy resins, phenol novolak epoxy resins and alicyclic epoxy resins, (iii) oxetane resins, (iv) phenol resins such as resol resins and novolak resins, and (v) silicone-modified organic resins such as silicone epoxies and silicone polyesters. These resin materials may be used singly, or two or more may be used in combination.

Other Embodiments

While the battery according to the present disclosure has been illustrated based on the above embodiment, the scope of the present disclosure is not limited to the above embodiment and includes various modifications from the embodiment that can be conceived by those skilled in the art, and other embodiments constructed by combining some constituent elements in the embodiments, without departing from the spirit of the present disclosure.

Various modifications such as changes, replacements, additions and omissions may be made to the embodiments described hereinabove within the scope of the claims and the equivalence thereof.

The battery according to the present disclosure may be used as, for example, a secondary battery such as an all-solid-state battery in various types of apparatuses such as electronic devices and automobiles.

What is claimed is:

1. A battery comprising:
a first solid-state battery cell; and
a buffer layer, wherein
the first solid-state battery cell includes a positive electrode, a negative electrode and a solid electrolyte layer located between the positive electrode and the negative electrode,
the positive electrode or the negative electrode has a current collector,
the buffer layer is in contact with a face of the current collector opposite to the solid electrolyte layer,
the buffer layer includes a metal, an alloy layer, a thermally expandable material and a conductive resin,
the alloy layer is at the interface with the current collector,
the metal is at least one selected from the group consisting of Sn, Bi, Al and Zn,
the alloy layer includes an alloy containing the metal, and
the thermally expandable material is foamable particles.

2. The battery according to claim 1, wherein the foamable particles are coated with the metal.

3. The battery according to claim 1, wherein
the battery further includes a second solid-state battery cell, and
the first solid-state battery cell and the second solid-state battery cell are laminated together through the buffer layer.

4. The battery according to claim 1, wherein
the solid electrolyte layer includes a solid electrolyte having lithium ion conductivity.

5. The battery according to claim 1, wherein
the foamable particles are microcapsules containing a gas inside the microcapsules.

* * * * *